July 7, 1936.                H. M. STOLLER                2,046,705
ELECTROMAGNETIC DEVICE
Filed Sept. 28, 1932
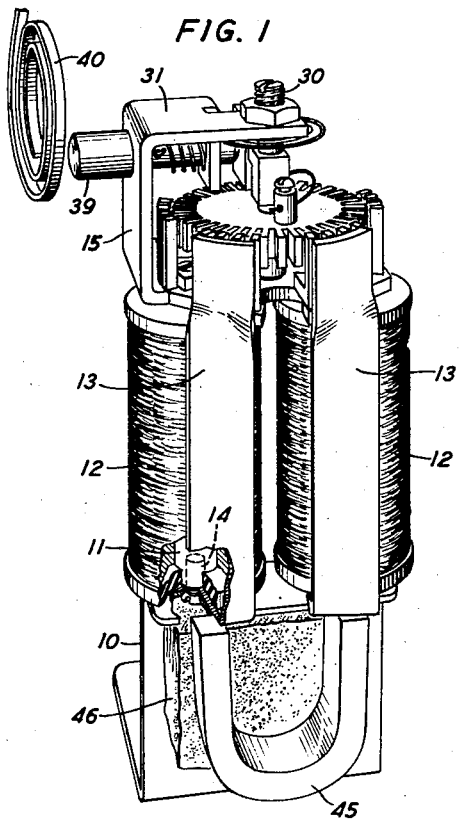
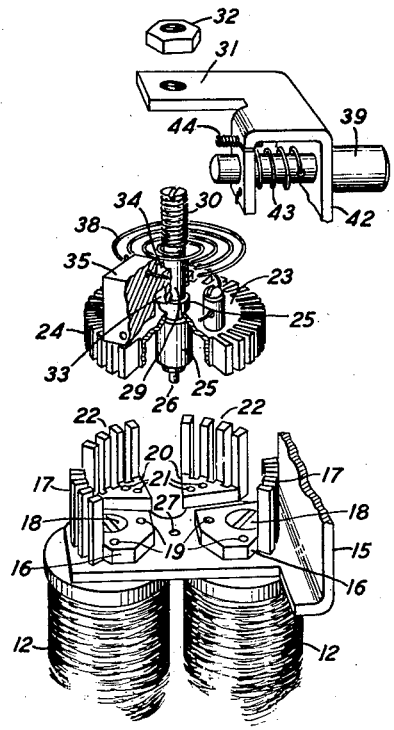
INVENTOR
H. M. STOLLER
BY
Walter E. Kiesel
ATTORNEY Patented July 7, 1936

2,046,705

UNITED STATES PATENT OFFICE 2,046,705

ELECTROMAGNETIC DEVICE

Hugh M. Stoller, Mountain Lakes, N. J., assignor to Bell Telephone Laboratories, Incorporated, New York, N. Y., a corporation of New York Application September 28, 1932, Serial No. 635,160

8 Claims. (Cl. 177—7)

This invention relates to electromagnetic devices and more particularly to alternating current signaling devices for telephone substations.

An object of the invention is to obtain a specific reduction ratio between the frequency of the impressed signaling current and the frequency of the final ringing impulse whereby a single stroke ringer may be operated by the usual central office equipment.

In one embodiment of this invention, an alternating current ringer comprises a self-starting synchronous motor, a percussion member coupled to the rotor thereof, a retractile spring connected to the percussion member and to a stationary support, and an audible signaling device, such as a gong, adapted to be actuated by the percussion member. When an excitation current is applied to the motor, the rotor is advanced in step automatically and revolves in one direction, carrying with it the percussion member against the action of the retractile spring. The spring is of such construction that after the rotor has revolved through a predetermined arc, the tension in the spring overcomes the motor torque and forces it out of synchronism. Upon loss of synchronism the motor torque drops to a fraction of its synchronous value and the retractile spring revolves the percussion member and the rotor at high velocity in the reverse direction until the percussion member strikes a push rod or clapper for sounding the signal gong. The rotor thereupon is advanced in step and the sequence of operations is repeated. The motor and spring are so constructed and correlated that the signal gong is struck at relatively widely separated intervals.

The invention and the various features thereof will be understood more clearly and fully from the following detailed description with reference to the accompanying drawing in which:

Fig. 1 is a perspective view in elevation of an alternating current ringer illustrative of one embodiment of this invention with parts broken away to show details of assembly more clearly;

Fig. 2 is a top view of the ringer shown in Fig. 1;

Fig. 3 is an exploded view of the ringer of this invention shown partly broken away and partly in section to illustrate the relation of the stator and rotor of the motor and the other elements of the device; and Fig. 4 is a diagrammatic view showing the relative disposition of the stator and rotor teeth of the synchronous motor of the device of this invention.

Referring now to the drawing, the ringer includes a flanged mounting bracket or base 10 of non-magnetic material, such as brass, upon which a pair of excitation coils are mounted, each including a core 11, only one of which is shown, and a winding 12. The coils are secured to the bracket or base 10 together with L-shaped magnetic poles 13 by machine screws 14 which extend through the bracket or base and the poles and are threaded into the cores 11. A non-magnetic stamping or plate 15 which may be of brass, is mounted upon the opposite ends of the cores 11, as shown more clearly in Fig. 3, and has mounted thereon a plurality of stator segmental magnetic members or polepieces. Two of these members comprise a sector-shaped base 16 and a plurality of integral milled teeth or segments 17 extending vertically on one edge of the base 16. The base portions 16 are secured to the cores 11 by machine screws 18 and are secured to the stamping 15 by pins or rivets 19. Another pair of magnetic members provided with a sector-shaped base 20 which is secured to the stamping 15 by pins or rivets 21 have a plurality of uniformly spaced milled teeth or segments 22 which engage with the poles 13. The segments 17 and 22, as shown more clearly in Fig. 4, are disposed on the circumference of a circle and form the pole pieces of the stator of a synchronous motor.

The rotor of the motor is disposed concentrically within the teeth or segments 17 and 22 and comprises a flat disc 23 of magnetic material, such as iron, having a plurality of peripheral teeth or segments 24 which have the same spacing or pitch as the segments 17 and 22, and an axially disposed hub 25. The hub 25 is provided with an axial bore 28 through which a reduced portion 29 of a bearing pin extends. The bearing pin is provided with a portion 30 which is threaded into an arm 31 of the stamping 15 and has mounted thereon a lock nut 32 for securing the bearing pin in position. The other end 26 of the pin fits into a bore 27 in the stamping 15. A percussion member, preferably of metal, is loosely mounted upon the reduced portion 29 of the bearing pin and comprises a hub 33, an arm 34, and an enlarged head or hammer 35. The percussion member is resiliently coupled to the rotor by a bent wire 36, shown more clearly in Fig. 2, which is secured to the head or hammer 35 at one end, and to a stud 37 mounted on the rotor at the other end.

The percussion member is also connected to the bearing pin 29 by a spiral spring 38 which is contracted by the clockwise rotation of the percussion member and the rotor 23.

A push rod or clapper 39 for striking a signaling member such as a spiral spring gong 40 extends slidably through parallel arms 41 and 42 of the stamping 15 and is connected to the arm 41 by a helical torsion spring 43. An adjustable stop, such as a set screw 44, is mounted on the arm 41 and limits the movement of the percussion member.

In the specific embodiment shown, the stator and rotor constitute a two phase synchronous motor, the magnetic circuit of which includes the poles 13, pole pieces 20, 22, rotor 23, pole pieces 16 and 17 and cores 11. A permanent magnet 45 may be mounted adjacent the poles 13 to produce a biasing flux, the magnet being spaced from the base or support 10 by a pad 46 of felt or the like.

The relative positioning of the segments on the stator pole pieces and on the rotor is shown diagrammatically in Fig. 4, in which the groups of segments 17 are designated generally as A and D and the groups of segments 22 are designated generally as B and C. From this figure it will be seen that when the stator segments constituting group C are in alignment with the juxtaposed segments of the rotor, the stator segments constituting group D are in alignment with the interstices between the juxtaposed rotor segments. Likewise, the stator segments constituting group A are advanced a quarter pitch ahead of the adjacent rotor segments while the stator segments constituting group B are displaced one quarter pitch behind the corresponding rotor segments. The coils 12 are preferably connected in series, one of the coils being shunted by a condenser (not shown) so that the currents through the coils 12 are 90° out of phase.

When an excitation current, such as a 20 cycle ringing current usually employed in central office telephone equipment, is supplied to the coils, the rotor is pulled into step automatically and revolves at a speed determined by the stator field divided by the number of rotor segments. Assuming for illustration a point in the current cycle corresponding to the position of the rotor shown in Fig. 4, that is when the current is a maximum in the coil corresponding to the poles C and D and a minimum in the coil corresponding to the poles A and B, the rotor segments in juxtaposition to the stator segments of group C are in alignment, and the torque effective between the rotor and the stator segments of group C has reached a maximum, while the torque effective between the rotor and the stator segments of group D is a minimum. The only flux between the rotor and the stator segments constituting groups A and B is that of the biasing magnet 45 so that the torques between the rotor and the stator segments A and B are counterbalanced. At the end of the next succeeding quarter cycle of excitation current the rotor has revolved in a clockwise direction so that the rotor segments are in alignment with the stator segments A, one-half pitch out of alignment with the segments B, and one quarter pitch out of alignment with each of the segments of groups C and D. At this point the torque effective between the segments of the rotor and the segments of group A has reached a maximum, while the torque effective between the segments of the rotor and the stator segments B is a minimum. The torques effective between the rotor and the stator segments of groups C and D are then counterbalanced. On succeeding quarter cycles the torque between the rotor and the stator teeth D reaches a maximum and then between the rotor and the stator teeth of group B.

The sequence of operations of the ringer described is as follows: When an excitation current is applied to the coils 12, the rotor automatically advances in step and revolves in a clockwise direction carrying with it the percussion member 35 so that the spiral spring 38 is wound up or stressed. When the rotor has revolved through a predetermined arc, the tension in the spring 38 becomes greater than the motor torque and as a result the motor is forced out of synchronism and its torque reduced thereby permitting the torsion spring 38 to assume control and the spring then rotates the percussion member and the rotor at high velocity in a counter-clockwise direction. The head or hammer 35 strikes the end of the push rod 39 to actuate the signal gong 40. After the gong is struck the rotor again advances in step and the sequence of operations is repeated.

The motor and spiral torsion spring 38 may be so constructed that the signal gong 40 will be actuated at any desired intervals. For example, the signaling device shown and described may be operated by 20 cycle ringing current which may be applied for two seconds at four second intervals. The rotor may have a speed of one-half revolution per second so that the gong 40 will be actuated at intervals of approximately six seconds.

Although a specific embodiment of the invention has been shown and described, modifications may be made, of course, without departing from the scope and spirit of this invention as defined in the appended claims.

What is claimed is:

1. An alternating current ringer comprising a signal gong, a rotatable member for actuating said gong, a self-starting synchronous motor including a rotor coupled to said member, and a retractile spring fixed at one end and connected to said member capable when stressed by rotation of said rotor of overcoming the motor torque, said motor and said spring being effective alternately to revolve said member in opposite directions whereby said gong is actuated periodically.

2. An electromagnetic signaling device comprising a signal gong, striking means for said gong, a self-starting synchronous motor having a rotor for revolving said means, and an elastic member coupled to said rotor and adapted to be stressed by revolution of said rotor in one direction, said elastic member being operable when stressed to overcome the motor torque and to revolve said rotor in the opposite direction to actuate said striking means.

3. A signaling device comprising a signal gong, striking means for said gong, a self-starting synchronous motor having a rotor for revolving said means, and a torsion spring fixed at one end and coupled to said rotor and striking means and adapted to be stressed by revolution of said rotor in one direction, said spring being effective when stressed to overcome the torque acting on said rotor and to revolve said rotor and striking means in the opposite direction to actuate said gong.

4. An alternating current ringer comprising a signaling member, means for actuating said member, a self-starting synchronous motor having a stator and a rotor, a mass member coupled to said rotor, and an elastic member connected to said mass member and adapted to be stressed by rotation of said mass member in one direction, said elastic member being effective when stressed to a predetermined degree to overcome the motor torque and to revolve said mass member in the opposite direction to impinge on said actuating means.

5. An alternating current ringer comprising a signal gong, striking means for said gong, a self-starting synchronous motor including a stator, a shaft, and a rotor mounted on said shaft, a percussion member for actuating said striking means rotatably mounted on said shaft and coupled to said rotor, and a spiral spring having a fixed portion and connected to said percussion member and adapted to be tensioned by rotation of said rotor in one direction, said spring being effective when tensioned to a predetermined degree to overcome the motor torque and to revolve said percussion member in the opposite direction to actuate said striking means.

6. An alternating current ringer comprising a self-starting synchronous motor including a rotor, a percussion member coupled to said rotor, signaling means, and a retractile spring fixed at one end and coupled to said percussion member and adapted to be stressed by rotation of said percussion member in one direction, said spring being effective when stressed to overcome the torque acting on said percussion member and to revolve said percussion member in the opposite direction to actuate said signaling means.

7. A signaling device comprising a signal gong, a clapper for actuating said gong, a shaft, a rotatable member mounted on said shaft, a self-starting synchronous motor having a rotor mounted on said shaft, and coupled to said member, and elastic means connected to said member, said elastic means being adapted to be stressed by rotation of said member in one direction and effective when stressed to a predetermined degree and while said motor is energized to revolve said member in the opposite direction to actuate said clapper.

8. A signaling device comprising a signal gong, means for actuating said gong, and means for actuating said first means including a self-starting synchronous motor having a rotor cooperating with said first means and a spring fixed at one end and coupled to said rotor at the other end and operable to reverse the direction of rotation of said rotor periodically.

HUGH M. STOLLER.